United States Patent [19]

Folse, Sr.

[11] 4,410,024

[45] Oct. 18, 1983

[54] APPARATUS AND METHOD OF ASSEMBLING BARGE FENDERS

[76] Inventor: Wofford M. Folse, Sr., P.O. Box 1210, New Iberia, La. 70560

[21] Appl. No.: 247,641

[22] Filed: Mar. 25, 1981

[51] Int. Cl.³ .......................... B27F 7/00; B27C 1/00; B27M 1/08

[52] U.S. Cl. ..................................... 144/353; 29/563; 29/564.1; 144/1 R; 144/35 R; 144/367; 144/379; 144/365; 408/25

[58] Field of Search .................... 29/563, 564.1, 564.2, 29/564.7; 408/24, 25, 26, 29; 144/1 R, 3 R, 35 R, 353, 365, 367, 379

[56] References Cited

U.S. PATENT DOCUMENTS 2,789,598  4/1957  Berger .................................. 408/25
3,331,410  7/1967  Mayo ..................................... 408/26
3,473,583  10/1969 Pallagrosi ............................ 408/25
3,543,374  12/1970 McConnel ......................... 29/564.2
3,546,772  12/1970 McConnel ......................... 29/564.1
4,221,246  9/1980  Grutter ............................... 144/3 R Primary Examiner—W. D. Bray
Attorney, Agent, or Firm—Keaty & Keaty

[57] ABSTRACT

A method of and apparatus for assembling barge fenders which includes chain conveyors for conveying the workpiece through a series of work stations. Spaced pairs of saws are positioned to make angled cuts. Downstream of the saws drilling mechanism provide holes in the workpiece for insertion of threaded bolts which are used at the assembly station to fasten a plurality of workpieces together.

17 Claims, 18 Drawing Figures

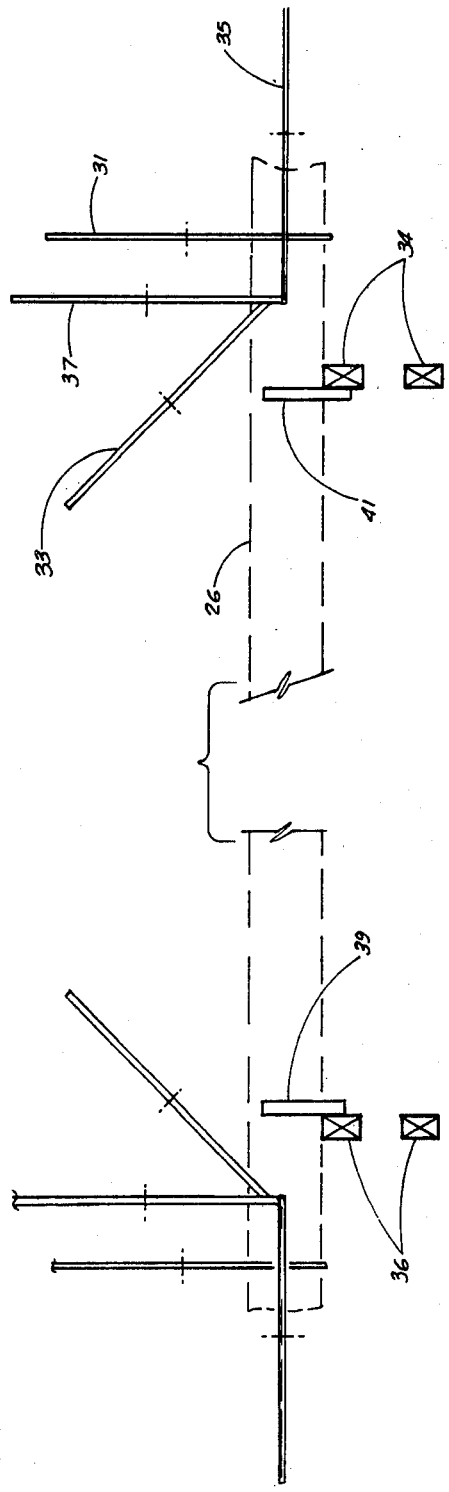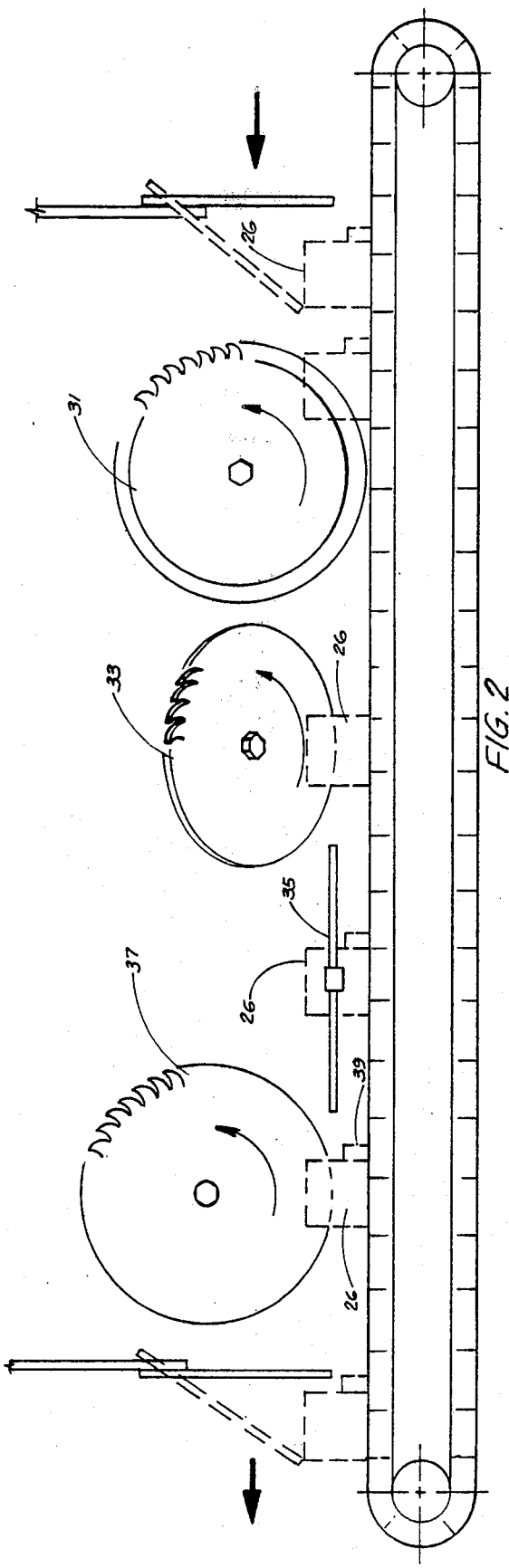

U.S. Patent  Oct. 18, 1983  Sheet 6 of 7  4,410,024
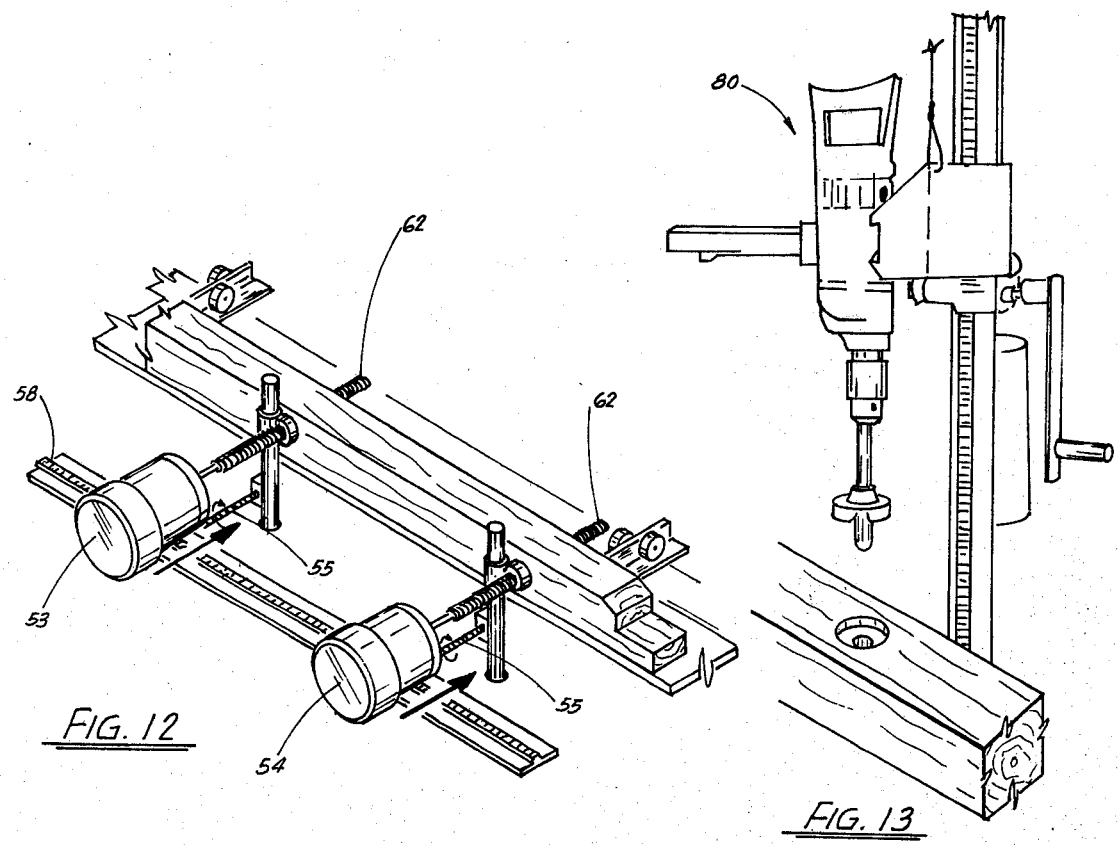
FIG. 12
FIG. 13
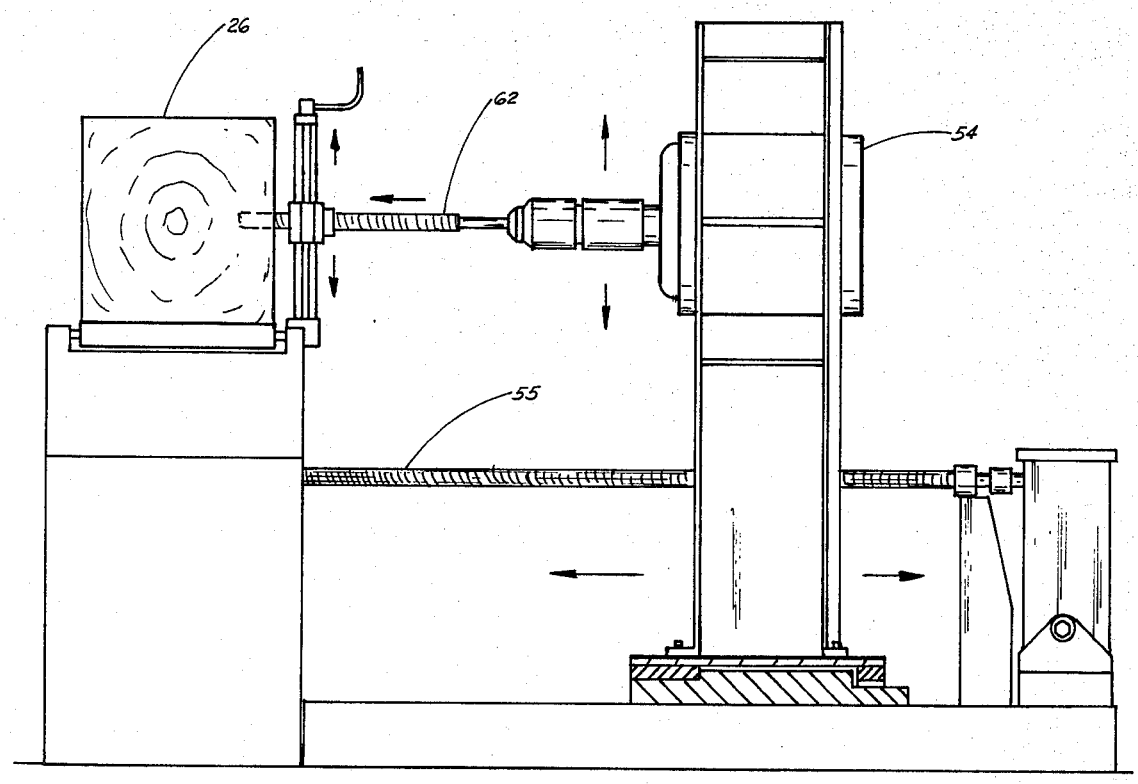
FIG. 14

APPARATUS AND METHOD OF ASSEMBLING BARGE FENDERS

BACKGROUND OF THE INVENTION

Field of the Invention

The present invention relates to a method and apparatus for preparing and assembling wooden work pieces, and more particularly relates to a method and apparatus of preparing individual wooden work pieces for assembly into barge fenders.

GENERAL BACKGROUND

In the transportation of material, either within the continental United States or overseas, transport barges are utilized very frequently. Since barges, for the most part, carry their contents within the hull of the barge, it is important that the barges are protected from coming into contact with objects which could pierce the skin of the barge and, consequently result in ruinage of the contents inside, or, even worse, sinkage of the barge, creating environmental and safety hazards.

One device which is utilized in the barge shipping industry, is to place on the side walls of the barge or on the side of a bridge or lock, etc., a "fender" which is constructed primarily of timbers assembled together to form a continuous fender along the length of the side of the barge. The assembled timbers are usually held upon the barge within a metal frame, and serve as a bumper area when the barge may come into contact with another barge, ship, or other objects in the course of its movement through open seas or navigable inland waterways for example.

In today's increasing transport of coal, oil and the like minerals, the use of barges has become more and more in demand, and therefore, the placement of fenders on these barges has become one factor in the availability of the barges for use and for their safe use. It is important that the barge be equipped with fenders as soon as possible upon construction, so that the barge may be ready for utilization for transport.

Prior art attempts a construction of and the assembling of barge fenders and is, for the most part, primitive. Barge fenders can be for example of ten (10) to twenty (20) foot length segments, and can be, on the typical barge, constructed, for example, of approximately one hundred (100) to two hundred (200) pieces laid side by side. Usually, each individual piece is custom cut to the proper length using a conventional saw, with the end of each piece then manually prepared with individual cuts done by a circular saw so that the individual piece can be placed within a support or metal framework supporting the wooden pieces at their ends and yet maintain the thick mid-section for serving as a fender.

The above manual process requires considerable expenditure of time and effort, with each individual segment of each fender being custom cut to the proper size. Once cut, each piece is drilled allowing the wooden work pieces to be assembled together into a continuous fender unit. Several patents disclose the use of machinery, such as saws, which align work pieces of wood and perform particular cuts. The following patents show machines that take a work piece of wood, perform a particular cut on it, some drilling of the work piece in the process:

U.S. Pat. No. 4,071,060 entitled "Cross Tie Adzing and Boring Machine" issued to G. D. Bush, Jan. 31, 1978.

U.S. Pat. No. 2,000,058 entitled "Adzing and Boring Machine" issued to G. B. Shipley, May 7, 1935.

U.S. Pat. No. 3,483,904 entitled "Woodworking Machine and Method" issued to J. R. Jacumin, Dec. 6, 1969.

The following patents disclose machinery that have plural saws performing various cuts on a work piece of wood as it is brought through the saw:

U.S. Pat. No. 4,098,310 entitled "Apparatus for Beveling Truss Components" issued to Sanford et al, July 4, 1978.

U.S. Pat. No. 4,123,190 entitled "Apparatus for Preparing Corrugated Sheets Automatically" issued to G. C. Baudot, Oct. 31, 1978.

U.S. Pat. No. 4,132,253 entitled "Machine for Notching Pallet Strangers" issued to T. O. Mills, Jan. 2, 1979.

U.S. Pat. No. 2,974,692 entitled "Saw and Method for Tongue and Groove Joints" issued to A. Bolenbach, Mar. 14, 1961.

The following patents disclose the use of plural saws that cut at various angles at the same time:

U.S. Pat. No. 3,732,906 entitled "Trestle Templet for Power Saws" issued to John Welgas, May 15, 1973.

U.S. Pat. No. 4,031,933 entitled "Tinon Cutting Machine with Circular Saws" issued to E. Piche, June 28, 1977.

The following patents illustrate woodworking saws that shape wood to different styles:

U.S. Pat. No. 4,117,755 entitled "log transport and Sawing System" issued to Hasenwinkle et al, Oct. 3, 1978.

U.S. Pat. No. 3,552,457 entitled "Log Break-Down Method and Apparatus" issued to A. Bos, Jan. 5, 1971.

U.S. Pat. No. 4,148,344 entitled "Portable Saw Mill" issued to Critchell et al, Apr. 10, 1979.

U.S. Pat. No. 1,686,915 entitled "Woodworking Machine" issued to F. L. Lane, Jan. 12, 1925.

GENERAL DISCUSSION OF THE PRESENT INVENTION

These cited patents (above) do not disclose an apparatus and method for quickly and efficiently processing assembling wooden work pieces into a barge fender, as does the present invention.

The method and apparatus of the present invention comprise feeding a wooden work piece into a pair of saw assemblies with each of the saw assemblies comprising at least three saw blades for performing selected cuts in combination on both ends of the wooden work piece. A conveying means would move the work piece through the saw assembly during the cutting operation onto an assembly where the work piece would then be delivered into the drill assembly, secured in position, and a plurality of drills would perform simultaneous drilling through the work piece at intervals along the length of the work piece. The work piece would then be conveyed to an area for alignment with various other work pieces, at which time an apparatus with bolts mounted thereupon would deliver the bolts through the aligned holes in the work pieces, and the bolts would be secured onto a selected number of work pieces to form a section of barge fender assembled. Other features of the apparatus would include the ability of at least one saw to move in a horizontal plane for the various lengths of work pieces involved, the ability of the drilling apparatus to move forward and backward as a single powered unit, and, on selected work pieces, an apparatus for countersinking, so that the heads of the bolts are not extruding from the work piece upon assemblage onto a barge.

Therefore, it is an object of the present invention to provide a method and apparatus for assembling wooden work pieces into a segment of barge fender;

It is a further object of the apparatus and method of the present invention to provide a system for efficiently and quickly assembling wooden work pieces into barge fenders;

It is still a further object of the present invention to provide a system of preparing and assembling barge fenders by providing a system of saws for performing a series of selected cuts simultaneously on both ends of the barge fender work pieces;

It is still a further object of the present invention to provide a system of preparing and assembling barge fenders which includes a feature for selectively drilling simultaneous holes through the work pieces as the work pieces are moved through the assembly line;

It is still a further object of the present invention to provide a system of preparing and assembling barge fenders which includes a feature for assembling work pieces into a segment of barge fenders;

It is still a further object of the present invention to provide a system of assembling barge fenders which would include the various steps of sawing, drilling and assembling the work pieces involved without the work piece ever having to be removed from the assembly line during the entire system process.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein:

FIG. 2 is a sectional view taken along lines 2—2 of FIG. 1, illustrating in side view the sawing portion of the apparatus of the present invention;

FIG. 3 is a view taken along lines 3—3 of FIG. 1, illustrating a frontal view of the pair of saw assemblies with a work piece illustrated in phantom lines;

FIG. 12 is a sectional view taken along lines 12—12 in FIG. 1, illustrating the drilling portion of the preferred embodiment of the apparatus of the present invention;

FIG. 13 illustrates the counter-sinking apparatus in the preferred embodiment of the apparatus and method of the present invention;

FIG. 14 illustrates a side view of the boring apparatus in the preferred embodiment of the apparatus and method of the present invention;

DETAILED DESCRIPTION OF THE PREFERRED EMBODIMENT

Figure 1:
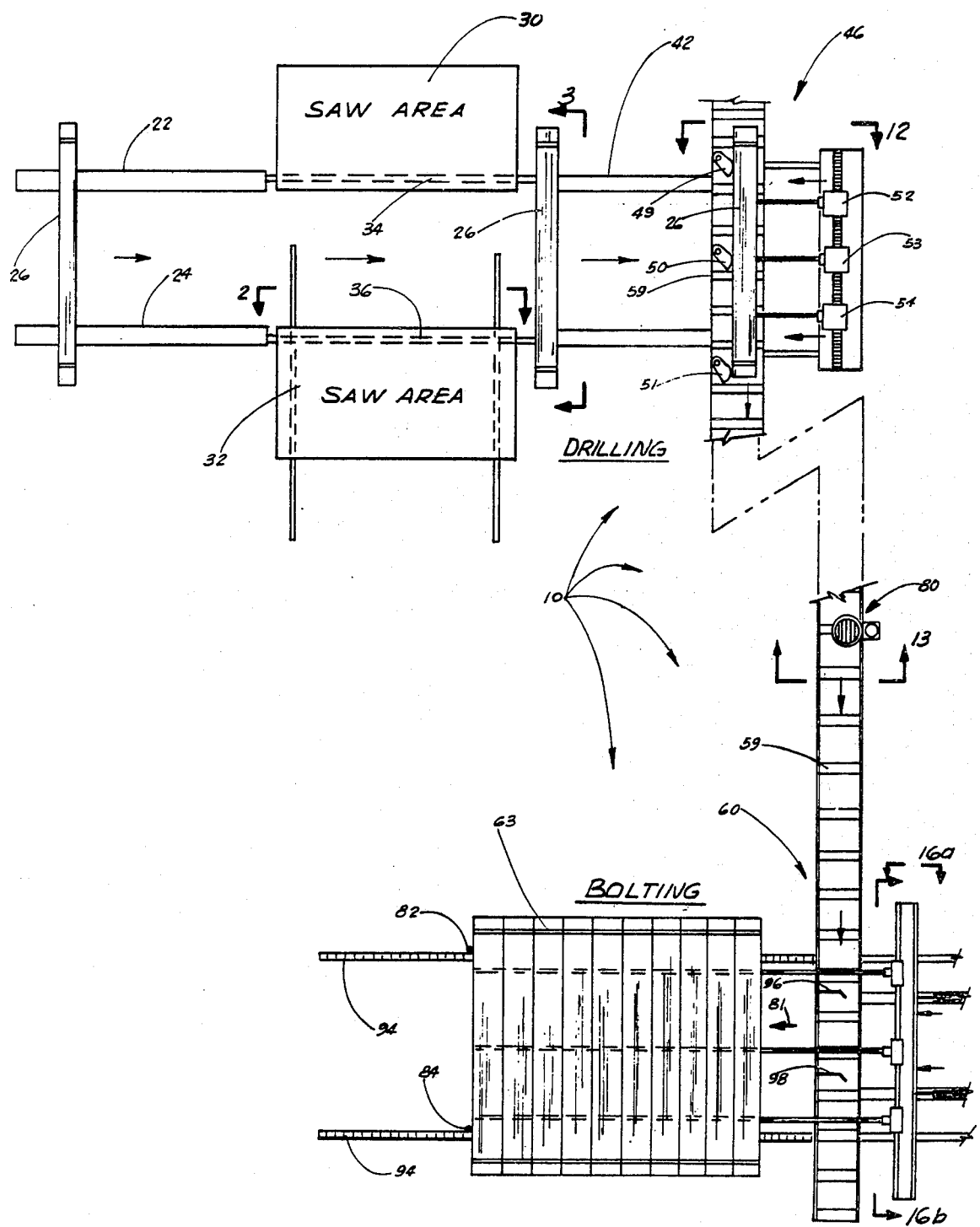
FIG. 1 is an overall schematic view of the preferred embodiment of the apparatus of the present invention.
Figure 6:
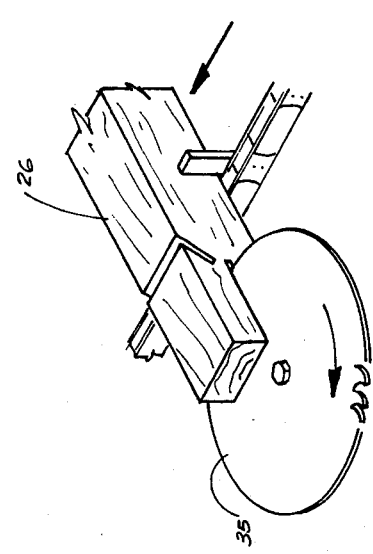
FIGS 4 through 8a illustrate in sequential views the various cuts made by the saw assembly portion of the preferred embodiment of the apparatus of the present invention.

The preferred embodiment of the apparatus and method of the present invention is best illustrated in FIGS. 1 through 16b, with the overall apparatus designated in FIG. 1 by Numeral 10. Apparatus 10 generally would comprise a pair of saw assemblies 30 and 32, with each of the saw assemblies comprising at least 4 saw blades designated by Numerals 31, 33, 35 and 37, as best illustrated in FIGS. 2 through 8, with each of the saw blades performing selected cuts on the ends of a wooden work piece 26. Work piece 26 would be delivered into saw assemblies 30 and 32 via feeder rollers 22 and 24 which are set in generally parallel relation to one another, for supporting the work piece as it is moved into position. Saw assemblies 30 and 32 would be located, in the preferred embodiment so that the ends of the work piece 26 would be fed through saw assemblies 30 and 32 on endless guide chain 34 and 36 during the operation of selectively cutting work piece 26. The details of the construction and sawing of work pieces 26 for eventual assemblage into barge fender units will be more fully discussed in subsequent FIGURES.

FIG. 1 would also illustrate work piece 26 following its passage through saw assemblage 30 and 32 and being fed upon a second set of feeder rollers 42 and 44 as it comes off of the endless guide chains 34 and 36 following the cutting operation. Work piece 26 would then be fed into boring assembly 46 in which work piece 26 will be rigidly secured by pegs 48 (FIG. 10) to prevent side movement of work piece 26 as it is set upon boring assembly rollers 59 (FIG. 10,12) and also set secure by arms 49 through 51 holding work piece 26 secure during the boring process. In the preferred embodiment of the method and apparatus of the invention, arms 49 through 51 would be hydraulically operated for rigidly securing work piece 26 during the boring process.

Further illustrated in FIG. 1, would be boring assembly which would include, in the preferred embodiment, at least 3 drills 52, 53 and 54, horizontally disposed, for simultaneously boring holes selectively spaced along the length of work piece 26. The drills 52 through 54, as will be more fully descussed, are preferably mounted for horizontal and vertical realignment depending on the length and width of the work piece to be bored.

Further illustrated in FIG. 1 in the preferred embodiment would be the step in the process subsequent to the boring process upon work piece 26. Following the boring process, work piece 26 would be moved on the assembly roller section 58 (FIG. 12) to the bolting area 60. Preferably, feeder rollers 58 would be automatically powered so that work piece 26 could be easily delivered to bolting area 60. At bolting area 60, work piece 26 would be aligned, for bolting into a large fender unit 63.

Preferably, a single bolt would be mounted and hydraulically pushed through the assemblage of work pieces, the number to be predetermined and a nut adhered to the end of the bolt in the bolting process.

FIGS. 2 and 3 as viewed on lines 2—2 and 3—3 of FIG. 1 respectively, illustrate the configuration of saw blades 31 through 37 in each saw assembly 30 and 32. Each saw assembly 30 and 32 would, in the preferred embodiment, comprise at least 4 saw blades, 31, 33, 35, and 37. As is further seen in FIGS. 2 and 3, the 4 blades would be disposed upon endless guide chains 34 and 36. Endless guide chains 34 and 36 are adapted with vertically extending upward arms 39 and 41, selectively spaced along the length of guide chains 34 and 36 for guiding a work piece 26 through the configuration of saws during the cutting process. Preferably, saws 31 through 37 would perform identical cuts on each end of work piece 26 simultaneously during the cutting process.

FIGS. 2 through 8a illustrate the type of cuts preferred on work piece 26 during the cutting process. First blade 31 would perform a cut through the cross section of work piece 26 (see wall portion 26a in FIG. 8a), thus, initially cutting the work piece at both ends to a clean and concise length along work piece 26. FIG. 3 illustrates in front view the cut made by each blade 31 through 37. A second blade 33 would then perform a 45° angle cut, in the preferred embodiment, the cut being approximately 6" from the end of the work piece 26 and approximately ⅛ into the width of work piece 26 (see wall portion 26f in FIG. 8a). The importance of this angle cut will be discussed further.

Blade 35 would then perform a third cut as the work piece is delivered further through the assemblage of saws of 30 and 32, the third cut being a horizontally disposed cut through the end of work piece 26, approximately ⅛ to the midline of the width of the work piece 26, and to a depth equal to that point that the second cut was performed. (See front wall portion 26h in FIG. 8a).

Figure 8A:
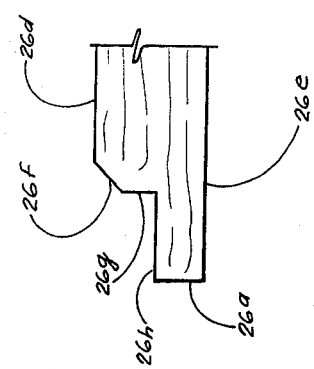
Figure 5:
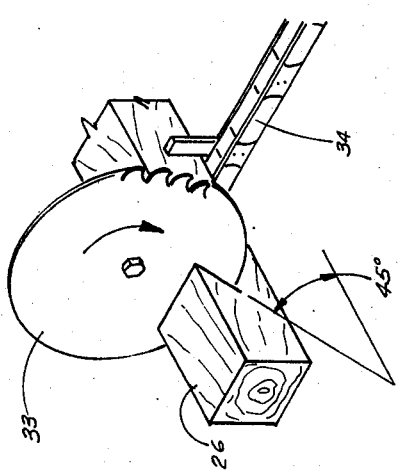
Figure 8:
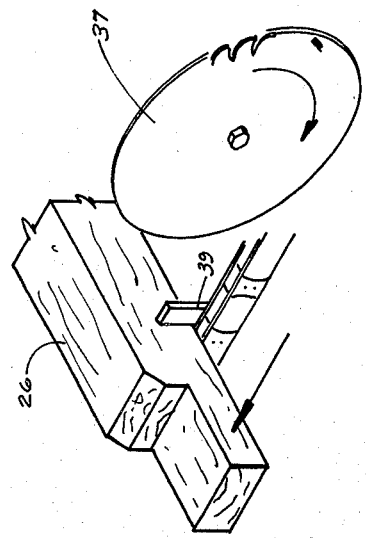
Figure 4:
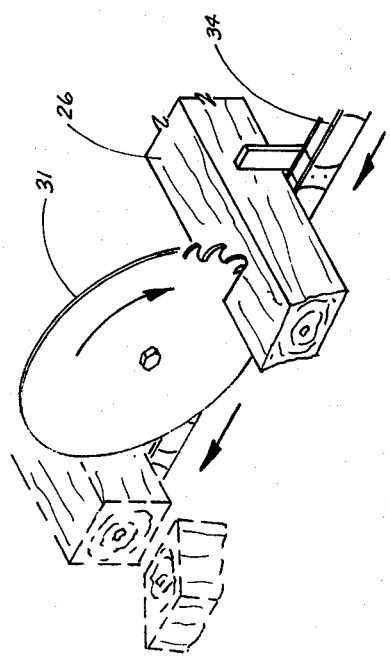
Figure 7:
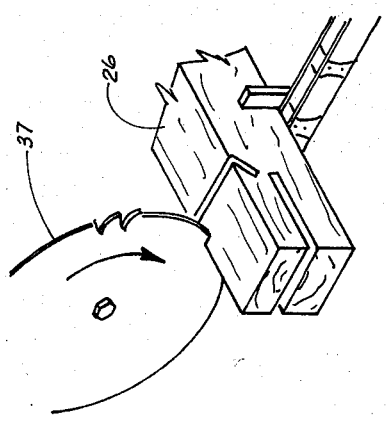

Blade 37 would then perform the final cut, that being a second vertical cut through the work piece 26, as illustrated in FIG. 3, to a depth of horizontal cut by blade 35. (see wall portion 26g in FIG. 8a). FIGS. 4 through 8 illustrate the sequential views of the cuts of the individual blades 33 through 37 as a work piece 26 moves through the saw assemblage 30 and 32. FIG. 8 illustrates one end of work piece 26, at it appears following the four cuts having been made by the four blades.

At this point it should be helpful to explain the necessity for the four cuts having been made on both ends of work piece 26. As is illustrated in FIG. 8a, a section of barge fender 90 is seen in side view. After unit has been assembled, and set up upon the side wall of the barge, end portion 26a, would be held in place against the side of the barge by the use of angle iron or the like means, with side 26e being disposed against the barge wall. That portion of the barge fender defined by fender wall portions 26d, 26f and 26g, as seen in FIG. 8a, would be that portion of the fender that would bear the brunt of the barge striking an obstacle against the barge fender. Therefore, it is essential that that portion be raised above the thickness of ends 26a as they are held fast against the side of the barge. Fender wall portion 26f as cut by saw 35 is angled at approximately 45°, since it has been found that when an object, such as a ship or other barge, strikes the barge fender work piece 26 at that point, if the wall portion 26f is cut off at a sharp 90° angle, then the fender would have a tendency to crack around that point and chip, often weakening the entire fender. With the 45° angle cut made by saw 35, the object would have a tendency to "slip" by and not produce as severe a shock to the fender as without the cut having been made. Subsequent FIGURES will illustrate the work piece 26 following the cutting of the end sections and the boring section 46 and bolt assembly section 60.

Figure 9:
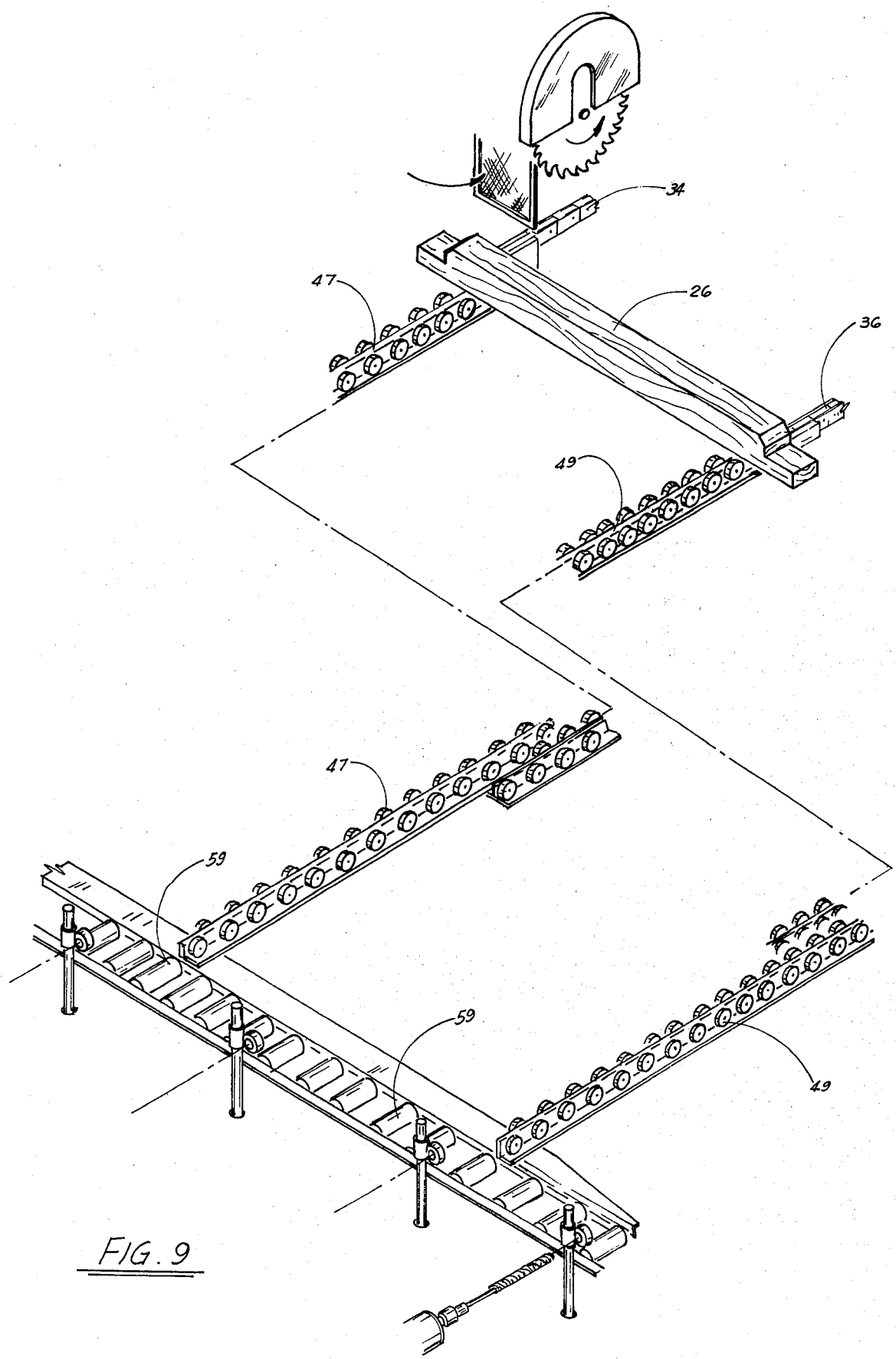
FIG. 9 illustrates the delivery system portion of the preferred embodiment of the apparatus, of the present invention for conveying a work piece between the cutting area and the drilling area.

FIGS. 9 through 12 illustrate work piece 26 in boring assembly area 46. As is illustrated in FIG. 9, work piece 26 is delivered out of saw assembly areas 30 and 32 by endless guide chains 34 and 36 onto a second set of parallel disposed feeder rollers 47 and 49. In the preferred embodiment, feeder rollers 47 and 49 as illustrated, would be slightly tilted away from saw assemblance 30 and 32, so that the work piece 26, following the cutting process would be pulled by gravity onto boring section 46.

FIG. 9 further illustrates the cooperation between feeder rollers 47 and 49 and boring assembly rollers 59. Work piece 26, would be delivered onto assembly froller 59, and proper positioned for boring of the holes.

Figure 10:
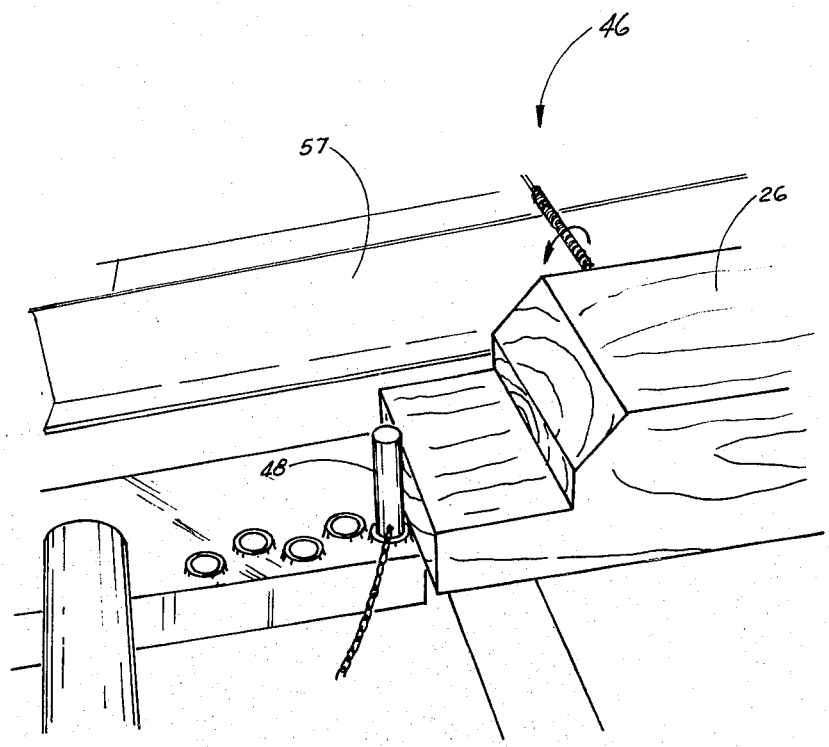
FIG. 10 illustrates in partial cut-away view a work piece secured in position for drilling in the apparatus of the present invention.
Figure 11:
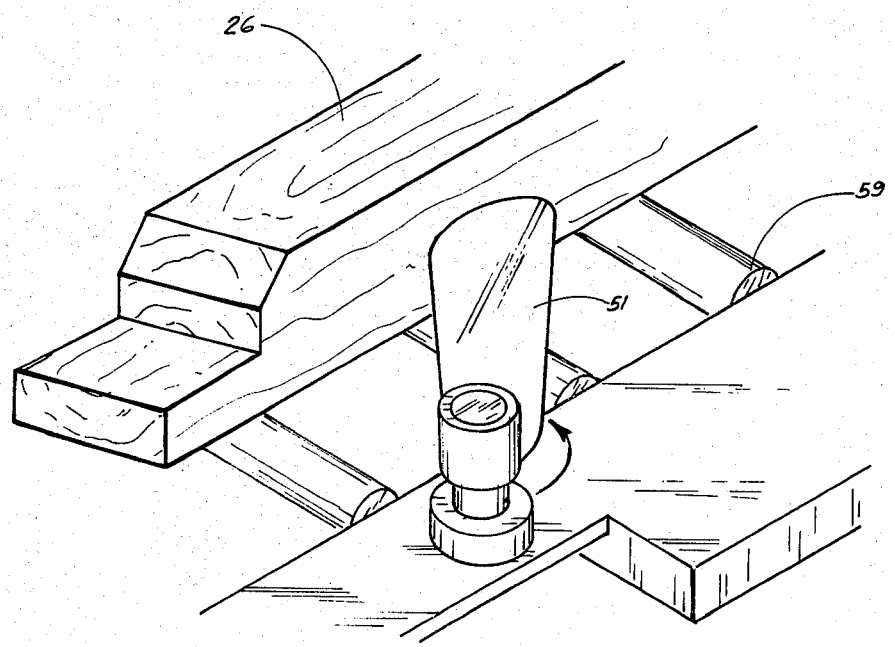
FIG. 11 illustrates in partial cut-away view an additional means of securing the work piece in the apparatus of the present invention.

FIGS. 10 through 12 illustrate in detail the configuration of the boring assembly 46 as seen in partial views, in FIGS. 10 and 11, work piece 26 having been delivered upon boring roller assembly 59, peg 48 would be set in place to prevent work piece 26 from having any lateral movement during the boring process. Peg 48 would be connected to rollers 59 in the preferred embodiment with a chain or the like flexible means, so that while not in use, peg 52 would hang freely, yet be readily available for use.

FIG. 11 illustrates 1 of 3 arms 54 which, in the preferred embodiment, would be hydraulically operated by a hydraulic system located in the area beneath rollers 59, and the arms (all three arms are viewed in FIG. 1) would simultaneously swing from a position away from the work piece 26 while the work piece is being placed in position for boring, and once hydraulically activated, one of two would swing to a position for rigidly securing work piece 26 against wall 57 during the boring process.

FIG. 12 illustrates work piece 26 during the boring process. Drills 52, 53 and 54 (as seen in FIG. 1) are disposed on a track 58 which is parallel to boring assembly rollers 59, so that drills 52 through 54 are movable in a horizontal plane along the length of the work piece. Also, drills 52 through 54 would be adjustable on a vertical plane. The horizontal and vertical adjustment of the drills 52 through 54 is necessary since barge fender units come in various weights, widths and lengths, thus the positioning of the bores in the center of the work pieces along their lengths must be modified accordingly.

Following the adjustment of drills 52, 53 & 54 in the proper position, the boring assembly would move the three drills toward the work piece, preferably by a pair of jack screws 55. In the preferred embodiment, each drill would have mounted thereupon, an elongated wood drill bit 62, horizontally disposed for simultaneously drilling three bores through the body of the work piece. As will be seen in subsequent FIGURES, the holes bored therethrough will be occupied by bolts when the work pieces 26 are bolted together into barge fender unit 63, as illustrated in FIG. 15.

Following the boring of holes 71, 72 and 73 by drills 52, 53 and 54, the work piece is then automatically delivered from the boring assembly area 46 to the bolting assembly area 60, along roller assembly 59 (see FIG. 1). Preferably, the rollers 59 would be automatically activated for automatic movement of the work piece 26 along the rollers 59. This could be done by means of an electric or hydraulic motor, with a belt or the like means rotating the rollers for moving the work piece along the roller system. Such a system is known in the art.

FIG. 13 illustrates a view of counter-sinking drill unit. In the construction of the board fender units, it is important that the wooden fender once assembled be the only portion of the assembled fender which is exposed to striking by foreign objects. Thus the work pieces on the ends of each section must be countersunk so that the head of the bolt 93 and the nut 92 are below or flush with the surface to prevent sheering off of the nut or the bolt head should the object strike the fender. Preferably, as seen in FIG. 1, the countersinking area 80 would be in that area between the boring area 46 and the bolting area 60, so that the selected work pieces, i.e. those which would be placed on the ends of each unit, may be counter-sunk as they move to the bolting area 60.

Figure 15:
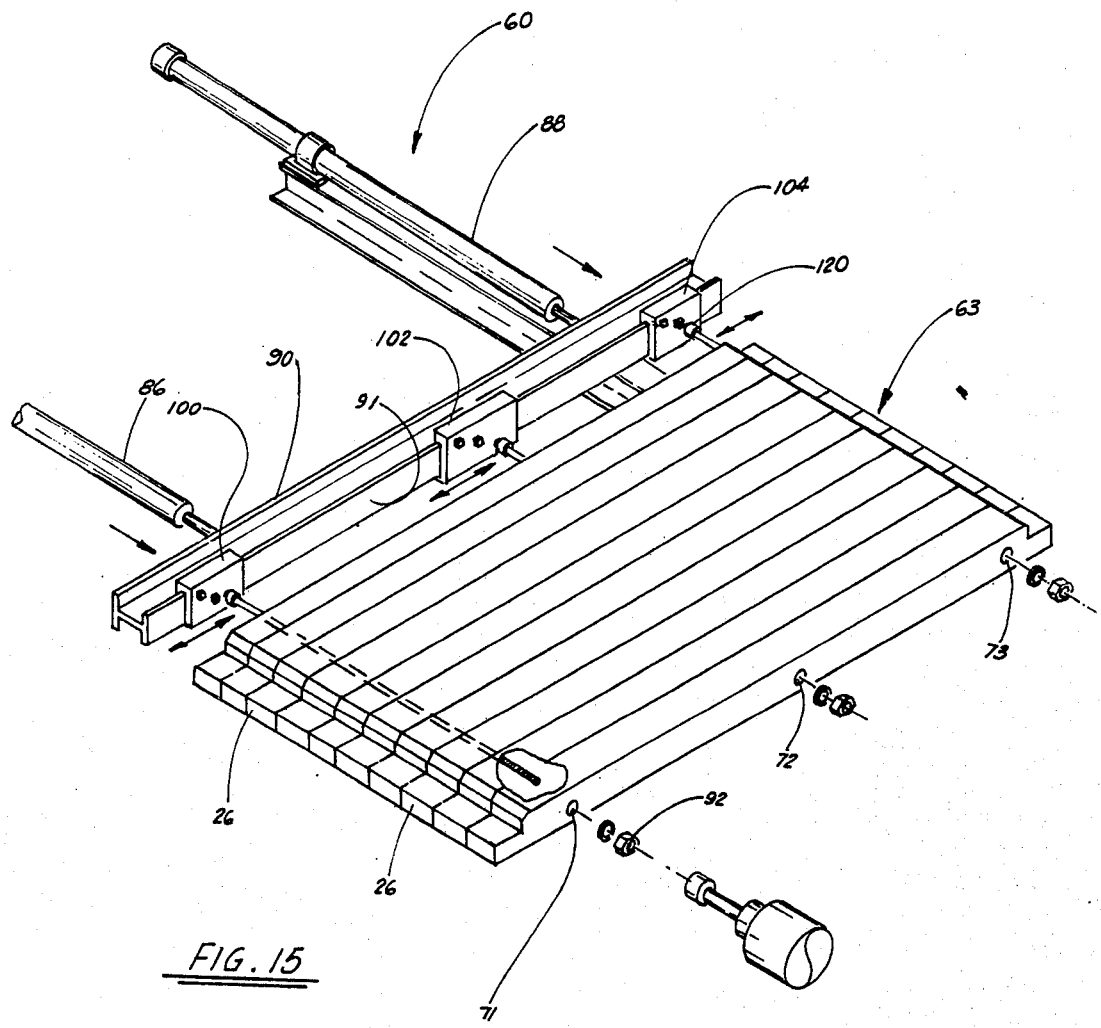
FIG. 15 illustrates the assembling area of the preferred embodiment of the apparatus and method of the present invention.
Figure 16A:
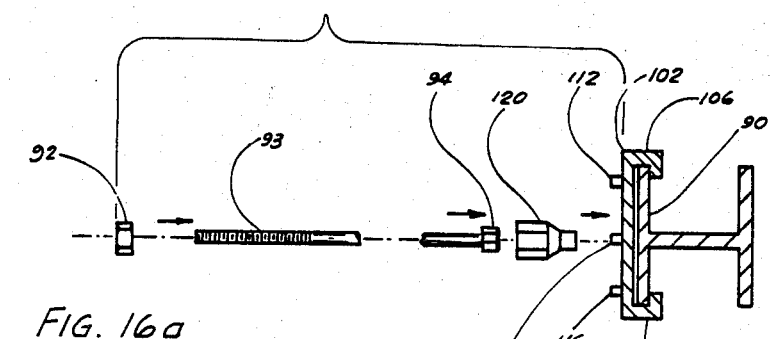
FIG. 16a illustrates, along lines 16a—16a of FIG. 1, the bolting apparatus in the preferred embodiment of the apparatus and method of the present invention.
Figure 16B:
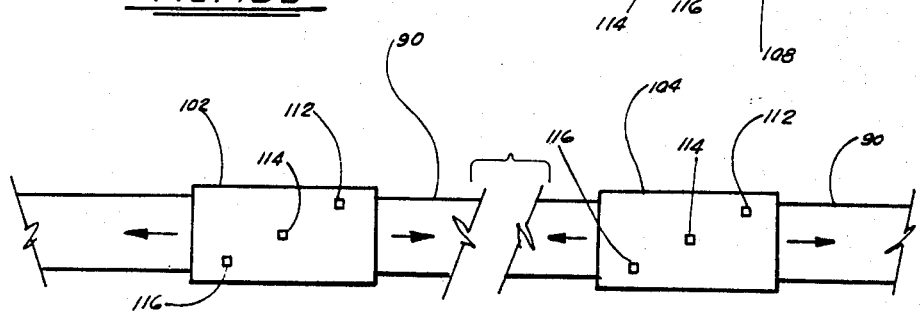
FIG. 16b illustrates along lines 16b—16b in FIG. 1, the front view of the bolting apparatus in the preferred embodiment of the apparatus and method of the present invention.

FIGS. 15 and 16a illustrate the bolting assembly area of the individual work pieces 26 into a barge fender unit 63. In FIG. 1, arrow 81 illustrates the positioning of work pieces 26 as they arrived at the bolting area, along roller system 59. In the preferred embodiment, work piece 26, would be moved from roller system 59 to the assembly rack 94 by movable arms 96 and 98 which can be seen in the set position in in FIG. 1. Arms 96 and 98 would preferably be hydraulically operated and would move from a position beneath the roller system to a position above the rollers, thus lifting the work piece 26 off of rollers 59 and sliding the work piece 26 onto assembly rack 94. Once upon the assembly, work piece 26 would have the ability to slide along the assembly 94 via rollers held on each unit of the assembly 94. Upon having lifted the requisite number of work pieces 26 on to assembly rack 94 (preferably 10 work pieces per unit), the work pieces are manually aligned so that holes 71 through 73 form a continuous bore throughout the work pieces 26 contained in the unit. The unbolted unit 63 is held in place with pegs 82 and 84 during the bolting process.

FIG. 15 illustrates the apparatus involved in bolting. Apparatus 60 is seen with a pair of hydraulic arms 86 and 88 having I-beam section 90 disposed horizontally and rigidly attached by welding or bolting as seen in FIG. 15.

Mounted on horizontal I-beams 90 are movable plates 100, 102 and 104. Movable plates 100, 102 and 104, as better seen in FIGS. 16a and 16b, would be mounted on the flange of I-beam section 90, with an upper and lower lip section 106 and 108 for grasping around the flange of I-beam 90 for horizontal movement across I-beam 90. The plates 100, 102 and 104 would have the ability to slide along the flange 91 in order to adjust to the various widths of the various locations of the holes drilled into the work piece 26, depending on the length of the work piece involved.

Keeping in mind that the holes are drilled in the midway portion of each work piece, and the work pieces come in various widths, plates 100, 102 and 104, as best seen in FIG. 16a, are adapted with three square raised projections 112, 114, and 116, which are disposed along the plates 100, 102 and 104 at three various heights. Each of the raised projections 112, 114 and 116, would receive the end of a socket 120. The socket 120 would be set upon projections 112, 114, 116 for holding the head 94 of bolt 93 during the bolting process. The thrusting of hydraulic arms 86 and 88 would move the I-beam section 90 with the plates 100, 102 and 104 and the bolt head 94 affixed thereto, forward through the alignment holes in the work pieces 26 of the barge fender unit. Once the end of bolt 93 would be visible through the last work piece section 26, a nut 92 would be rotatably affixed to bolt 93, with the nut 92 and the head 94 of the bolt 93, upon tightening of the nut 92 being located in the countersunken holes, thus the unit in readiness for positioning on to the wall of a barge.

In the preferred embodiment of the apparatus and method, as described in this specification, it should be made clear that the process from the first setting of a work piece 26 upon feeder rollers through the finished product of bolting the individual work pieces to 26 into a barge fender unit would require anywhere from 6 to 8 minutes for the assemblage of a single unit. Also, it should be noted that the barge fenders, as previously stated, would come in various widths and heights and that the entire system from the cutting, boring and bolting would have the ability to adjust to the various lengths and widths of the particular size of fender units involved.

What is claimed as invention is:

1. A method of making barge fenders, comprising the following steps:
  (a) providing a pair of endless guide chains for conveying a wooden work piece to be treated;
  (b) providing a pair of saw assemblies for performing selected cuts on the ends of said wooden work piece, each of said saw assemblies comprising:
    (i) a saw for performing first vertical cut to obtain a predetermined length of said work piece;
    (ii) a saw for performing a 45° angle cut to release ⅓ of the top portion of an end of said work piece;
    (iii) a saw for performing a horizontal cut midway through an end of the work piece to the depth of the 45° angle cut;
    (iv) a saw for performing a second vertical cut to adjoin the horizontal and the 45° angle cuts;
  (c) guiding said work piece so that both ends of the work piece enter the saw assembly simultaneously;
  (d) conveying the work piece through the saw assemblies;
  (e) performing four selected cuts on both ends of said work piece simultaneously;
  (f) conveying the work piece out of the saw assemblies following the cutting operation;
  (g) providing a bore assembly for drilling a plurality of holes simultaneously along the length of the work piece;
  (h) conveying the work piece into the boring assembly;
  (i) securing the work piece in the bore assembly and boring a plurality of holes in predetermined places along the length of the work piece;
  (j) conveying the work piece out of the bore assembly;
  (k) providing a bolting assembly for simultaneously bolting a plurality of work piece into a barge fender unit;
  (l) guiding the work piece into the bolting assembly and positioning it in alignment with a selected number of identical pieces for bolting them into the barge fender unit;
(m) providing means for assembling the work pieces into a single barge fender unit;
(n) bolting the work pieces and assembling them into the barge fender unit.

2. The method of claim 1, whereby the step of securing the work piece in the drilling assembly further includes the following steps:
(a) aligning the work piece substantially perpendicular to the drill assembly along its length;
(b) hydraulically moving a plurality of arm means to abutt the work piece in secure position to be drilled;
(c) providing means to prevent lateral movement of the work piece during the drilling operation.

3. The method of claim 1, wherein the step of simultaneously boring a plurality of holes further includes the step of automatically moving a plurality of drills in a horizontal plane toward the work piece, so that each of the drill bits simultaneously bore holes through the work piece.

4. The method of claim 1, wherein the step of guiding the work piece to the bolting assembly includes the step the automatically maneuvering of work piece along a set of rollers.

5. The method of claim 1, wherein the step of positioning of the work piece includes:
(a) providing a plurality of arms positioned below the rollers when not in use;
(b) positioning the work piece directly above the arms;
(c) automatically raising the arms so that the work piece is raised off of the rollers and onto a bolting assembly;
(d) performing the raising task for several work pieces, not to exceed 10;
(e) aligning the work pieces on the bolting assembly so that the holes combine into a continuous hole through the work pieces.

6. The method of claim 1, wherein the step of providing means for assembling the work pieces into a barge fender unit includes:
(a) providing a pair of hydraulically operated arm means with an I-beam transversely attached to said arm means longitudinally aligned along the length of the work pieces in such a manner that a web of the beam is positioned horizontally and parallel to the horizontal axis of the work pieces;
(b) providing a number of plate members slidably engaging the flange of the I-beam adjacent the work pieces; the number of said plate members equaling the number of holes drilled in the work pieces;
(c) providing projections on the plate members for engaging a socket means with a head of the bolt positioned therein in such a manner that a free end of the bolt is substantially aligned with the holes in the work pieces;
(d) automatically moving the I-beam toward the work pieces so that the bolt is slidably moved through the holes in the work piece unitl the free end of the bolt extrudes from the holes of the furthermost work piece;
(e) securing a nut on the free end of the bolt for completing the assembly of the barge fender unit.

7. The method of claim 1, further comprising the step of countersinking the holes in selected work pieces.

8. The method of claim 1, whereby the step of countersinking is performed between the steps of drilling the holes in the work pieces and bolting the pieces into a barge fender unit.

9. The method of claim 1, wherein the step of guiding the work piece through the saw assembly further includes the step of providing arms on said endless guide chains for pushing the work piece through the saw assemblies.

10. An apparatus for making barge fender units, comprising:
(a) a pair of saw assemblies for performing selected cuts on the ends of a wooden work piece, each of said saw assemblies comprising:
 (i) a saw for performing a first vertical cut to obtain a perdetermined length of said work piece;
 (ii) a saw for performing a 45° angle cut to release at least $\frac{1}{3}$ of the top portion of an end of said work piece;
 (iii) a saw for performing a horizontal cut midway through an end of the work piece to the depth of the 45° angle cut;
 (iv) a saw for performing a second vertical cut to adjoin the horizontal and the 45° angle cuts;
(b) means for conveying the work piece through the saw assemblies during cutting, said means including a pair of endless guide chains and vertical arm means for pushing the work piece through the saw assemblies;
(c) a drill assembly, comprising:
 (i) a plurality of drills for simultaneously drilling holes through the work pieces at intervals along the work piece;
 (ii) means for delivering the work piece in position for drilling;
 (iii) means for securing the work piece in position during the drilling process;
(d) an assembly apparatus comprising:
 (i) means for conveying the work piece in alignment with other work pieces so that said drill holes are aligned;
 (ii) means to secure said assemblage of work pieces into a single barge fender unit.

11. The apparatus in claim 10, further comprising a drill for selectively countersinking holes in selected work pieces.

12. The apparatus in claim 10 wherein at least one saw assembly is movable along a horizontal plain.

13. The apparatus in claim 10, wherein each of said saw blades is individually powered.

14. The apparatus in claim 10, wherein each of said saw blades is adjustable from the vertical to the horizontal.

15. The apparatus in claim 10, wherein said drill assembly further comprises a plurality of drills for drilling horizontal bores through selected spots in the work piece.

16. The apparatus of claim 10, wherein said means for assembling the work pieces comprises:
(a) a pair of hydraulically operated arm means;
(b) an I-beam transversely attached to said arm means and longitudinally aligned along the length of said work pieces in such a manner that a web of the beam is positioned horizontally and in parallel relation to the horizontal axis of said work pieces;
(c) a number of plate members slidably mounted on the flange of the beam adjacent the work pieces;

(d) a number of projections on said plates for receiving a socket means with a head of the bolt means positioned therein;

(e) a bolt and nut means for securing the work pieces together into a single barge fender unit.

17. The apparatus of claim 10, wherein said means for securing the work piece in position during the drilling process include a plurality of hydraulically operated arm means abutting the work piece along its length and a pair of peg means positioned adjacent the lateral ends of said work piece to prevent a lateral movement of the work piece during the drilling operation.

* * * * *